Patented Aug. 23, 1949

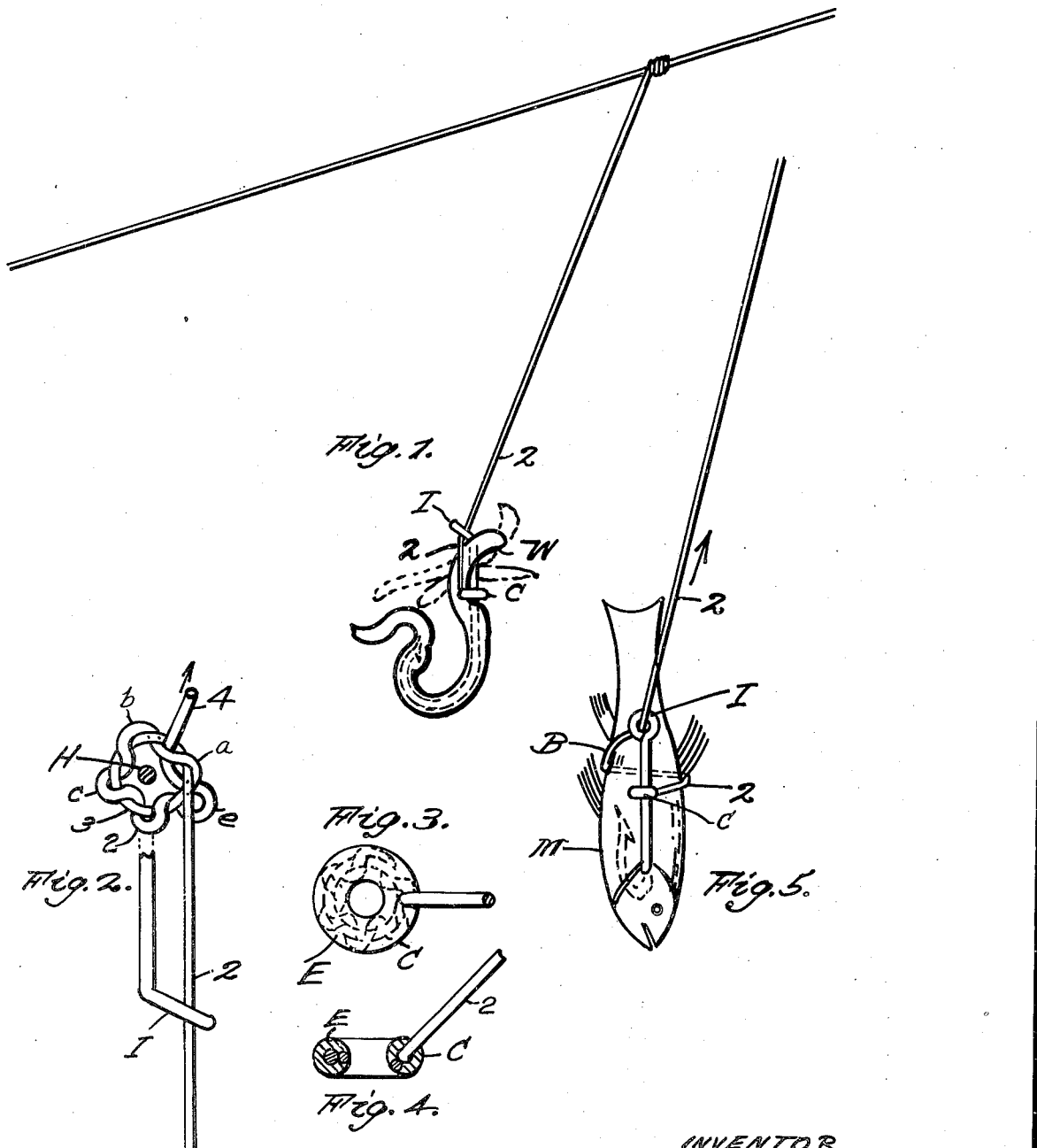

2,480,042

UNITED STATES PATENT OFFICE 2,480,042

SNELLED FISHHOOK

Paul A. Nelson, Inglewood, Calif.

Application August 27, 1947, Serial No. 770,904

2 Claims. (Cl. 43—27)

This invention is a fish hook and snell combination.

Great difficulty is had by line fishermen in keeping several kinds of bait on the conventional barbed hook; the bait being commonly merely threaded onto the hook to conceal the wire body thereof. From multitudinous causes the bait is either stream stripped or mechanically rubbed off the hook, or torn off by bad strikes of the attacking fish.

It is therefore very desirable to provide a simple and practical, and inexpensive means for securely clinching an applied bait aside from the mere impalement of the bait by threading it on a hook. And, in this connection, it is an object to provide a bait clamp of such form of structure that it entirely eliminates the need of any other structural element than the usual or conventional snell of the hook; the snell in the present invention being used, itself alone, to form a frictional collar embracing and easily slidable along the hook, wire body in a manner to form a contractive snare, of the snell, to receive and close onto an interposed body of bait or bait material.

A purpose is to provide a secure snell collar that will not permanently lock itself when a heavy line pull is exerted, and which can be readily pressed back or away from the hook eye when tension on the snell is released.

A further purpose is to provide a self-binding or friction-grip, shiftable connection, of the snell to the hook, formed into a collar composed of wrappings of the snell on a core ring formed of the snell and which will operate to grip the interposed hook body at any position of the collar and prevent the snell, when under low tension from stream pressure, from cutting through the snared bait.

Also, a purpose of the invention is to provide a snell connection in the form of an extremely short collar whereby to permit the entire length of the hook, whether shankless or not, to be covered by bait. Many types of snell connections are of such length or of such form as to prevent this desirable capacity.

Further an object is to provide a snell collar connection which may be readily rotated on the hook body to form a snare of helical form into which desired bait, a minnow for instance, may be securely clinched to the hook as well as being impaled on the barb.

Also an object of the invention is to provide a snell connecting collar which may be readily shifted to any desired location either on the straight or the curved portions of the hook body, as will be a great advantage when large bodies of bait material are to be used.

Particularly, an object of the invention is to provide a slidable snell connector of such a form that it will reliably stay put in bait clinching position and will not shift and loosen the bait when subjected to backwater eddies.

Fig. 1 is a side elevation of the invention. Fig. 2 is a diagram of the loose snell coiling. Fig. 3 is a plan of the complete collar. Fig. 4 is a diametrical section of the collar. Fig. 5 is an elevation of a mode of bait clamping by the snell.

The invention resides in certain advancements in this art as set forth in the ensuing disclosure and has, with the above, additional objects and advantages as hereinafter developed, and whose constructions, combinations and details of means, and manner of operation, and method of making will be made manifest in the herewith illustrative embodiment; it being understood that modifications, variations and adaptations may be resorted to within the scope, spirit and principles of the invention as it is claimed in conclusion hereof.

As disclosed a conventional fish hook is employed and to it is connected a suitable snell 2 preferably of a flexible and resilient filamentary material in the nature of a catgut or adaptable plastic substance.

One end of the snell is threaded through the eye I of the hook H, and a reliable but slidable connection of the end of the snell is made and effected by a collar, formed of the snell itself, slidably but frictionally embracing the body wire of the hook.

The construction of the collar C is best understood from Fig. 2 of the drawing. After the snell 2 is passed into the eye of the hook the snell is bent into a ring form 3 entirely around the hook body H to constitute a core and then the snell is wrapped on the core forming ring 3 to form a plurality of successive helices a, b, c, d and e (though not limited in number of wraps); the core ring being large enough to permit of the making of these helices between the hook body and the ring 3. The ring and the helical winding of the snell on the ring are then snugly tensioned about the hook body by a strong pull on the lead end 4 of the snell and this end is finally drawn out between the core ring 3 and cut off short at the collar thus constructed.

The collar is snug enough on the hook body to frictionally grip the body and stay put at any location to which the ring may be adjusted; the snell meanwhile being free and slidable in the hook eye I. It will be noticed that the snell extending from the formed collar C is well spaced from and generally parallel to the length of the hook body.

Preferably the skeletal collar C formed by the intercoiled snell 2 is jacketed by an envelop or casing E of a suitable waterproof and self-setting or hardening material, in the nature of a sealing wax or plastic substance. This envelop rounds out the collar skeleton and affords a smooth and practical finger purchase.

As seen in Fig. 1 a bait worm W is impaled from nearly end to end in the usual manner on the hook H but a substantial part of the upper end of the worm is left free and is then tucked in between the hook body and the outwardly spaced part of the snell 2 just above the collar C. The collar is then gradually pushed up along the hook toward the eye I so that the worm end is clinched firmly, without cutting, in the snare formed between the hook and the collar and the adjacent snell end. The friction of the collar is such as to normally hold itself at any place along the hook.

A feature of the invention is that the collar can be rotated around the hook body as in Fig. 5 whereby to form a helical bight B. In such a case a minnow M can be hooked in the gill and the shank of the hook laid up along one side of the minnow and clinched in the bight B of the snell.

Shown in dotted lines in Fig. 1 is an additive bunch of worms to increase the lure.

What is claimed is:

1. A snelled fish hook comprising a hook having an eye at one end, and a snell slidably passing through the eye and having its lower end forming a collar frictionally embracing and slidable along the body of the hook; the snell forming a snare between the eye and the said collar to clinch onto interposed bait against the hook body adjacent the hook eye and the collar being composed of a primary core ring of the snell, and an enveloping of waterproof material encasing the ring to give size to the collar; the ring consisting of a single coil of the snell material and an enveloping helix of the snell material directly on the coil.

2. A snelled fish hook comprising a hook having an eye and a snell slidably passed through said eye and a stiff flat collar composed of a ring core of the snell per se and an enveloping skeletal helix of the snell built around said core; the helix being bodily encased in a body-building jacket slidably receiving the shank of the hook.

PAUL A. NELSON.

REFERENCES CITED

The following references are of record in the file of this patent:

UNITED STATES PATENTS

| Number | Name | Date |
|---|---|---|
| 2,222,554 | Wirth et al. | Nov. 19, 1940 |
| 2,333,503 | Worden | Nov. 2, 1943 |
| 2,359,410 | Edwards | Oct. 3, 1944 |
| 2,457,428 | Worden | Dec. 28, 1948 |